(12) United States Patent
Sakamoto et al.

(10) Patent No.: US 6,875,951 B2
(45) Date of Patent: Apr. 5, 2005

(54) LASER MACHINING DEVICE

(75) Inventors: Masahiko Sakamoto, Tokyo (JP); Shozui Takeno, Tokyo (JP); Yasuhiko Iwai, Tokyo (JP); Toshiyuki Hokodate, Tokyo (JP); Miki Kurosawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 311 days.

(21) Appl. No.: 10/111,611

(22) PCT Filed: Jul. 27, 2001

(86) PCT No.: PCT/JP01/06504

§ 371 (c)(1),
(2), (4) Date: Apr. 26, 2002

(87) PCT Pub. No.: WO02/18090

PCT Pub. Date: Mar. 7, 2002

(65) Prior Publication Data

US 2002/0153361 A1 Oct. 24, 2002

(30) Foreign Application Priority Data

Aug. 29, 2000 (JP) ........................................ 2000-258991

(51) Int. Cl.⁷ .............................................. B23K 26/06
(52) U.S. Cl. ............................ 219/121.73; 219/121.74; 219/121.75
(58) Field of Search ....................... 219/121.73, 121.74, 219/121.78, 121.6, 121.75

(56) References Cited

U.S. PATENT DOCUMENTS 6,034,349 A * 3/2000 Ota ....................... 219/121.73
6,058,132 A   5/2000 Iso et al.
6,087,625 A   7/2000 Iso
2002/0017510 A1 * 2/2002 Lauer et al. ........... 219/121.69
2002/0023903 A1 * 2/2002 Ngoi et al. ............ 219/121.68

FOREIGN PATENT DOCUMENTS

| CN | 1195591 A | 10/1998 |
|---|---|---|
| CN | 1199661 A | 11/1998 |
| JP | 58-33803 | 2/1983 |
| JP | 63-174314 | 11/1988 |
| JP | 2-015887 | 1/1990 |
| JP | 11-192571 | 7/1999 |
| JP | 11-314188 | 11/1999 |
| JP | 2000-190087 | 7/2000 |

* cited by examiner

*Primary Examiner*—M. Alexandra Elve
(74) *Attorney, Agent, or Firm*—Burns, Doane, Swecker & Mathis, L.L.P.

(57) ABSTRACT

A laser machining device according to the invention is provided with a laser oscillator for generating a laser beam, a main deflecting galvannometer mirror, an Fθ lens, and a sub-deflecting means arranged in an optical path between the laser oscillator and the main deflecting galvannometer mirror. A means for splitting a laser beam is provided, and the sub-deflecting means is inserted into the optical path of one of the split laser beams. At the same time, both the split laser beams are incident from the same main deflecting galvannometer mirror to the Fθ lens, and a numerical aperture in the optical system constituted by the main deflecting galvannometer mirror, the Fθ lens, and an object is set to be not more than 0.08.

18 Claims, 10 Drawing Sheets

LASER MACHINING DEVICE

TECHNICAL FIELD

The present invention relates to a laser machining device and, more particularly, to a laser machining device used in high-speed precise hole drilling or the like.

BACKGROUND ART

FIG. 9 is a general laser machining device for hole drilling. In FIG. 9, a laser machining device 101 has a laser oscillator 103 for generating a laser beam 102, a bend mirror 104 arranged to guide the laser beam 102 emitted from the laser oscillator 103 in a desired direction by reflection, galvanometer scanners 106a and 106b respectively having galvanometer mirrors 105a and 105b serving as movable mirrors sequentially arranged along an optical path, an Fθ lens 108 for converging the laser beam 102 the traveling direction of which is controlled by the galvanometer scanners 106a and 106b onto an object 107, and an X-Y stage 109 driven on an X-Y plane and having an upper surface on which the object 107 is fixed.

The operations of the respective components used when hole drilling is performed by using such a laser machining device will be described below.

The laser beam 102 having a pulse waveform oscillated depending on a frequency and an output value which are predetermined by the laser oscillator 103 is guided to the galvanometer scanners 106a and 106b by the bend mirror 104. One of the galvanometer scanners 106a and 106b is rotated in a direction corresponding to the X direction of the X-Y stage 109, and the other is rotated in a direction corresponding to the Y direction. Therefore, the laser beam 102 can be scanned at an arbitrary position within a limited area on the X-Y plane. The laser beam 102 is incident on the Fθ lens 108 at various angles. The laser beam 102 is corrected such that the laser beam 102 is incident on the Fθ lens 108 by the optical characteristics of the Fθ lens 108 perpendicularly to the X-Y stage 109.

In this manner, the laser beam 102 can be freely positioned by the galvanometer scanners 106a and 106b with respect to any coordinates on the X-Y plane within a limited area (to be referred to as a scan area) on the X-Y stage 109. The laser beam 102 is irradiated on the position to machine the object 107.

Upon completion of the machining in the scan area, the X-Y stage 109 moves to a position serving as a new scan area of the object 107 to repeat machining.

In particular, when the object 107 is a printed circuit board, and when it is desired to perform machining for a relatively precise hole, an optical system may be an image transfer optical system. FIG. 10 is a schematic diagram showing the positional relationships between the optical components when an image transfer system is used. In FIG. 10, reference symbol a denotes a distance between an aperture 110 for setting a beam spot diameter on the object 107 and the Fθ lens 108 on the optical path, reference symbol b denotes a distance between the Fθ lens 108 and the object 107 on the optical path, and reference symbol f denotes a focal distance of the Fθ lens 108. The focal distance f of the Fθ lens 108 is set to be equal to the distance between the Fθ lens 108 and a center position 111 on the optical path between the two galvanometer mirrors 105a and 105b.

In the image transfer optical system the above positional relationships, the effective radiuses of the galvanometer mirrors 105a and 105b are represented by gr. In this case, when the distance a is sufficiently larger than the distance b, a numerical aperture NA in the optical system of the Fθ lens 108 and the object 107 is expressed by equation (1):

$$NA = gr/(b^2+gr^2)^{1/2} \quad (1)$$

When the wavelength of the laser beam is represented by λ, a beam spot diameter d on the object is expressed by equation (2)

$$d = 0.82\lambda/NA \quad (2)$$

In addition, since the image transfer optical system is used, a, b, and f are set to have such a positional relationship that the relations expressed by equation (3) is established.

$$1/a + 1/b = 1/f \quad (3)$$

Therefore, for example, in order to obtain a beam spot diameter d of 95 μm by a laser having a wavelength λ of 9.3 μm, the numerical aperture NA must be 0.08 according to equation (2). In this manner, according to equation (2), in order to decrease the beam spot diameter d to perform precise hole drilling, the numerical aperture NA must be large.

For this purpose, it is understood according to equation (1) that the effective radius gr at which a laser beam from the galvanometer mirror can be reflected without deteriorating the quality of the laser beam is preferably increased. For example, in order to achieve a beam spot having a diameter at least smaller than the beam spot diameter d=95 μm by an optical system which satisfies f=100 mm and b=107 mm, b=107 mm is satisfied according to equation (3). For this reason, in order to satisfy NA>0.08, it is understood according to equation (1) that gr>8.6 mm is satisfied.

In order to improve the productivity of the laser machining device, the drive speed of the galvanometer scanner must be high. For this reason, in general, it is said that to decrease a galvanometer mirror or to decrease the deviation angle of the galvanometer mirror is effective.

Japanese Unexamined Patent Publication No. 11-192571 discloses a laser machining device which branches a laser beam with a branching means, guides respective laser beams to a machining position with scanning means, and converges the respective laser beam to perform machining.

In addition, Japanese Unexamined Patent Publication No. 11-314188 discloses a laser machining device in which a laser beam is split by a half mirror, and split laser beams are guided to a plurality of galvanometer scanners and irradiated on a plurality of machining areas through Fθ lenses.

However, when a galvanometer mirror diameter is decreased, an effective radius gr decreases, and a numerical aperture NA decreases according to equation (1). As a result, a beam spot diameter d which satisfies the relation expressed equation (2) increases, and such a problem that precise hole drilling cannot be performed is posed.

In addition, when the deviation angle of the galvanometer mirror is reduced, respective scan area sizes become small. For this reason, the number of scan areas increases. In general, since a time required for positioning by the galvanometer scanner 106 is considerably longer than a time required for positioning of the X-Y table, the number of scan areas increases. When the number of times of movement by the X-Y stage increases, although the speeds in the respective scan areas increases, such a problem that the entire production rate is not improved is posed.

Furthermore, in the device disclosed in Japanese Unexamined Patent Publication No. 11-192571, in order to control and converge slit laser beams, galvanometer scanners (galvanometer meters and galvanometer mirrors) and Fθ lenses corresponding to the respective laser beams are required. For this reason, when a laser beam is split into two laser beams, galvanometer scanners and Fθ lenses the numbers of which are twice the numbers of galvanometer scanners and Fθ lenses of the laser machining device shown in FIG. 9, and the problem of an increase in cost is posed. In order to simultaneously machine two objects to obtain twice machining speeds, an X-Y table the size of which is twice the size of the X-Y table of the laser machining device is required, and such a problem that the machining device increases in size is posed.

Still furthermore, in Japanese Unexamined Patent Publication No. 11-314188, respective split laser beams are guided to a plurality of independent galvanometer scanner systems and converged by Fθ lenses. For this reason, since a laser beam which is incident from the final galvanometer mirror onto the Fθ lens in the optical path is largely obliquely incident, the influence of the aberration of the Fθ lens increases, and such a problem that the laser beam cannot be easily converged in a small area.

DISCLOSURE OF INVENTION

The present invention has been solve the above problems, and an object is to provide a laser machining device which suppresses an increase in cost while improving productivity in precise machining and which is not increased in size.

Therefore, the laser machining device has:
a first scanner for deflecting a traveling direction of a first laser beam to an arbitrary direction with a mirror;
a second scanner for deflecting traveling directions of a second laser beam and the first laser beam passing through the first scanner to arbitrary directions with mirrors; and
a lens for converging the second laser beam and the first laser beam passing through the second scanner.

In addition, the laser machining device has a configuration in which
the first laser beam and the second laser beam have different polarization directions, and
a beam splitter which reflects one laser beam and transmits the other laser beam is arranged in front of the second scanner such that the laser beams from the beam splitter are propagated to the second scanner.

The laser machining device further has:
an oscillator;
a diffractive optics for splitting a linearly polarized laser beam oscillated from the oscillator into a first laser beam and a second laser beam; and
a phase plate for changing the polarization direction of the second laser beam.

The laser machining device still further has:
an oscillator; and
a spectral beam splitter for splitting a circularly polarized laser beam oscillated from the oscillator into a first laser beam and a second laser beam having different polarization directions, respectively.

Furthermore, an aperture is formed in front of the diffractive optics, so that an image transfer optical system can be formed between the aperture and an object arranged behind the lens.

Still furthermore, an aperture is formed in front of the spectral beam splitter, so that an image transfer optical system can be formed between the beam splitter and an object arranged behind the lens.

Furthermore, a distance in which the first laser beam is propagated from the diffractive optics to the lens is made almost equal to
a distance in which the second laser beam is propagated from the diffractive optics to the lens.

Still furthermore, a distance in which the first laser beam is propagated from the spectral beam splitter to the lens is made almost equal to
a distance in which the second laser beam is propagated from the spectral beam splitter to the lens.

Still furthermore, a numerical aperture calculated by a mirror diameter of the second scanner and a distance between the lens and the object is set to be not less than 0.08.

The laser machining device has:
a first scanner for deflecting a traveling direction of a first laser beam to an arbitrary direction with a mirror;
a second scanner for deflecting traveling directions of a second laser beam and the first laser beam passing through the first scanner to arbitrary directions with mirrors;
a third scanner for deflecting a traveling direction of the first laser beam passing through the first scanner to an arbitrary direction with a mirror; and
a lens for converging the second laser beam passing through the second scanner and the first laser beam passing through the third scanner.

Furthermore, an aperture is formed in at least one of the traveling direction of the first laser beam in front of the first scanner and the traveling direction of the second laser beam in front of the second scanner, so that an image transfer optical system can be formed between the aperture and an object arranged behind the lens.

Still furthermore, a numerical aperture calculated by the mirror diameter of the second scanner and the distance between the lens and the object is set to be not less than 0.08.

The laser machining device has:
a first scanner for deflecting a traveling direction of a laser beam to an arbitrary direction with a mirror;
a second scanner for deflecting a traveling direction of the laser beam passing through the first scanner to an arbitrary direction with a mirror; and
a lens for converging the laser beam passing through the second scanner,
an angle at which the laser beam is deflected by the first scanner being smaller than an angle at which the laser beam is deflected by the second scanner.

Furthermore, an aperture is formed in front of the first scanner, so that an image transfer optical system is formed between the aperture and an object arranged behind the lens.

Still furthermore, a numerical aperture calculated by the mirror diameter of the second scanner and the distance between the lens and the object is set to be not less than 0.08.

In this manner, the number of beam irradiation on an object can be increased, the productivity can be improved and the productivity can be achieved similarly even in precise hole drilling.

BEST MODE FOR CARRYING OUT THE INVENTION

Embodiment 1.

Figure 1:
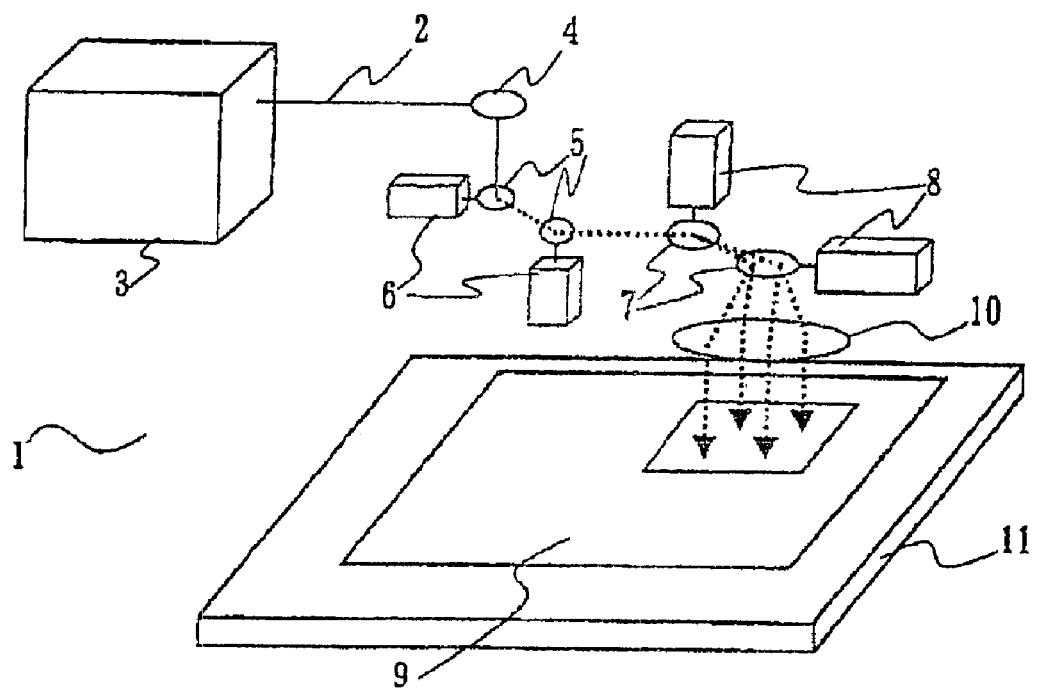
FIG. 1 is a schematic diagram of a laser machining device according to Embodiment 1 of the present invention.

FIG. 1 shows a laser machining device according to the embodiment. In FIG. 1, a laser machining device 1 has: a laser oscillator 3 for generating a laser beam 2; a bend mirror 4 arranged to guide the laser beam 2 emitted from the laser oscillator 3 in a desired direction by reflection; sub-deflecting galvanometer scanners (first galvanometer scanners) 6 having sub-deflecting galvanometer mirrors (first galvanometer mirrors) 5 which are sequentially arranged along an optical path and can be moved to deflect the laser beam 2; galvanometer scanners (second galvanometer scanners) 8 having main deflecting galvanometer mirrors (second galvanometer mirrors) 7 which sequentially arranged along an optical path and can be moved to deflect the laser beam 2; an Fθ lens 10 for converging the laser beam 2 onto an object 9; and an X-Y stage 11 having an upper surface on which the object 9 is fixed and driven on an X-Y plane. The sub-deflecting galvanometer mirrors 5 are constituted by two galvanometer mirrors including a galvanometer mirror corresponding to the X direction of the X-Y stage 11 and a galvanometer mirror corresponding to the Y direction. The two sub-deflecting galvanometer scanners are arranged to drive these mirrors. The main deflecting galvanometer mirrors 7 are similarly constituted by two galvanometer mirrors including a galvanometer mirror corresponding to the X direction of the X-Y stage 11 and a galvanometer mirror corresponding to the Y direction. The two main deflecting galvanometer scanners are arranged to drive these mirrors.

An operation of the device according to the present invention will be described below.

The laser beam 2 oscillated according to a frequency and an output value preset by the laser oscillator 3 and having a pulse waveform is guided to the sub-deflecting galvanometer mirrors 5 of the sub-deflecting galvanometer scanners 6 and the main deflecting galvanometer mirror 7 of the main deflecting galvanometer scanners 8 by the bend mirror 4.

In this manner, the sub-deflecting galvanometer scanners 6 and the main deflecting galvanometer scanners 8 are driven, so that the laser beam 2 can scan an arbitrary position within a limited area on the X-Y plane. The laser beam 2 is incident on the Fθ lens 10 at various angles. However, the laser beam 2 is corrected such that the laser beam 2 is incident on the Fθ lens 10 perpendicularly to the X-Y stage 11 by the optical characteristics of the Fθ lens 10.

Figure 2:
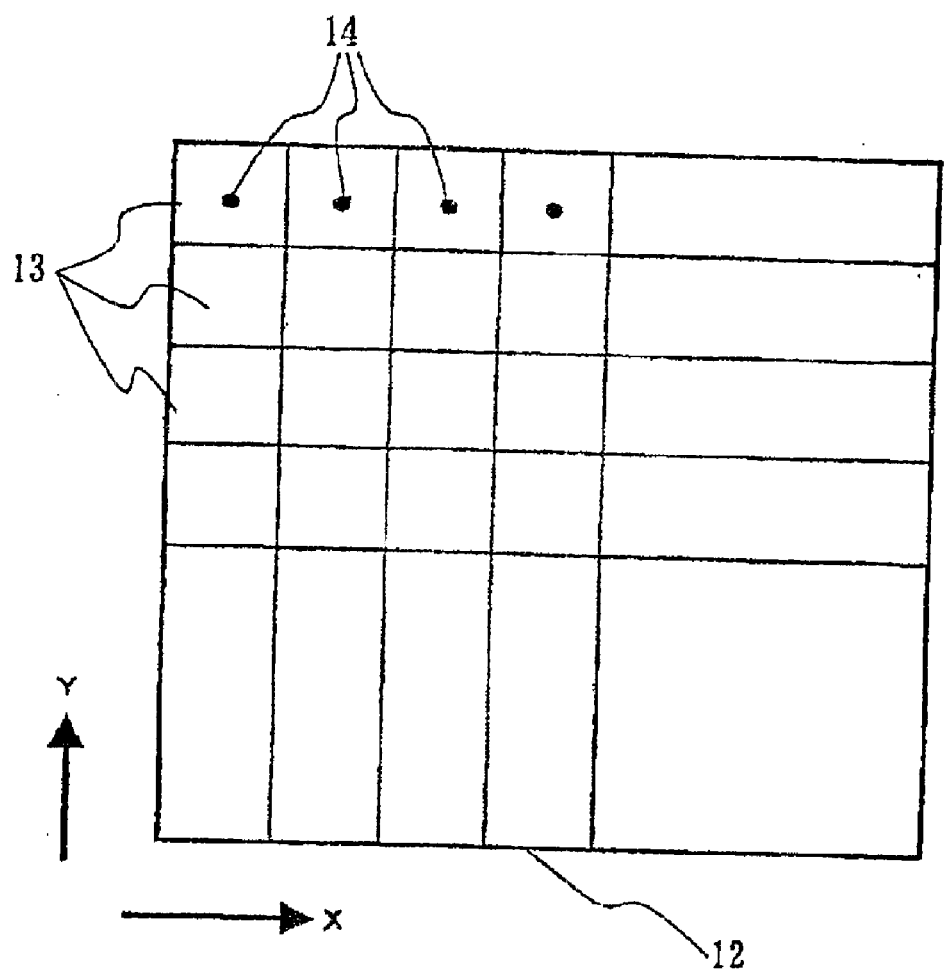
FIG. 2 is a diagram for explaining laser irradiation positions according to Embodiment 1 of the present invention.

FIG. 2 is a diagram for explaining a galvanometer scan area on the object 9 according to the embodiment.

In FIG. 2, in a scan area 12 which is an area which can be scanned by the main deflecting galvanometer scanners 8 serving as a main deflecting means for deflecting the laser beam 2 at a large angle, sub-scan areas 13 which can be scanned by the sub-deflecting galvanometer scanners 6 serving as sub-deflecting means for deflecting the laser beam 2 at a small angle are arranged.

These relations will be described below with reference to concrete examples. It is assumed that the scan area 12 is a regular square area which has one side having a length of 50 mm. In this case, when the sub-scan area 13 is set to be a regular square area which has one side having a length of 5 mm, up to 100 scan areas 12 can be arranged in the main deflecting scan area.

An operation of the sub-deflecting galvanometer scanners 6 and the main deflecting galvanometer scanners 8 corresponding to the divided scan areas as described above will be described below.

When the sub-deflecting galvanometer scanners 6 and the main deflecting galvanometer scanners 8 do not receive commands from control devices (not shown), the sub-deflecting galvanometer scanners 6 and the main deflecting galvanometer scanners 8 are held at specific reference positions. The reference positions can be changed by adjustment of an optical path and a setting on the control. However, in this case, positions where the laser beam 2 is irradiated on the center of the scan area 12 in the state that the laser beam 2 passes through deflection centers of the respective galvanometer mirrors are set as reference positions.

The irradiation position of the laser beam 2 moves to a preset position 14 serving as the center of a sub-scan area 13 such that the main deflecting galvanometer scanners 8 are driven from the reference positions in the scan area 12. The main deflecting galvanometer scanners 8 are held at the positions, and the sub-deflecting galvanometer scanners 6 are driven, so that machining is performed in a sub-scan area 13. In this manner, upon completion of the machining in one of the sub-scan areas 13, the main deflecting galvanometer scanners 8 are driven to move the irradiation position of the laser beam 2 to the center position of the next sub-scan area, so that machining is performed. The operation is repeated until machining is completed in the entire area of one scan area 12. When the machining is completed, the X-Y stage 11 is driven, and machining for the next scan area is performed. The operation is repeated until machining for an entire expected area set on the object 9 is completed.

Figure 3:
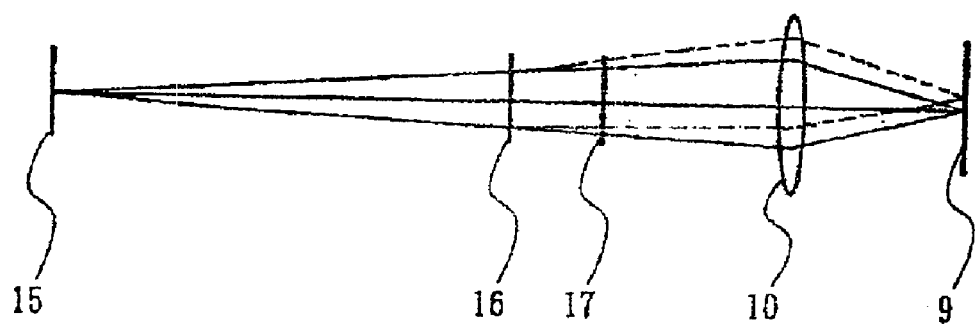
FIG. 3 is a diagram showing the configuration of an optical system according to Embodiment 1 of the present invention.

FIG. 3 is a schematic diagram showing the positional relationships of each optical components of the embodiment. In FIG. 3, a flux of light indicated by solid lines expresses the laser beam 2 reaching the object 9 through an aperture 15 formed in a laser output unit of the laser oscillator 3 or in the middle of an optical path in front of the laser output unit, a center position 16 in an optical axis direction between the two galvanometer mirrors of the sub-deflecting galvanometer mirrors 5, a center position 17 in an optical axis direction between the two galvanometer mirrors of the main deflecting galvanometer mirrors 7, and the Fθ lens 10. At this time, the respective galvanometer mirrors are held at the reference positions. On the other hand, a flux of light indicated by dotted lines is the laser beam 2 which is deflected such that the sub-deflecting galvanometer mirror 5 is changed from the reference position. As shown in the figure, it must be considered that the laser beam 2 is deflected (offset) by the sub-deflecting galvanometer mirrors 6 and partially gets out of the main deflecting galvanometer mirrors.

For this reason, when a precise hole having a diameter of about 100 μm or less is machined, as expressed by equation (1), in addition to the distance between the Fθ lens 10 and the object 9 and the effective diameters of the main polarizing galvanometer mirrors 7, the positional relationships between the main deflecting galvanometer mirrors 7 and the sub-deflecting galvanometer mirrors 5, and the deflecting angles of the sub-deflecting galvanometer mirrors 5 are considered so that the laser beam is prevented from getting out of the main deflecting galvanometer mirrors 7. A numerical aperture NA must be held to satisfy NA>0.08.

In this manner, when the sub-deflecting galvanometer mirrors 5 are moved by a small angle, high-speed positioning can be performed within a relatively small sub-scan area, and a machining time can be shortened. Since the main deflecting galvanometer scanners are used in movement between sub-scan areas, the speed of movement is higher than that of movement by the X-Y stage, and a moving time is shortened.

In the embodiment, the galvanometer scanners which drives the galvanometer mirrors are used as means for sub-deflecting a laser beam. However, a scanner which deflects a laser beam by applying a current to an element by using a piezoelectric element such as a piezo or a scanner constituted by an acoustic optical element which changes a deflection angle of a laser beam depending on an ultrasonic frequency may be used.

Embodiment 2.

Figure 4:
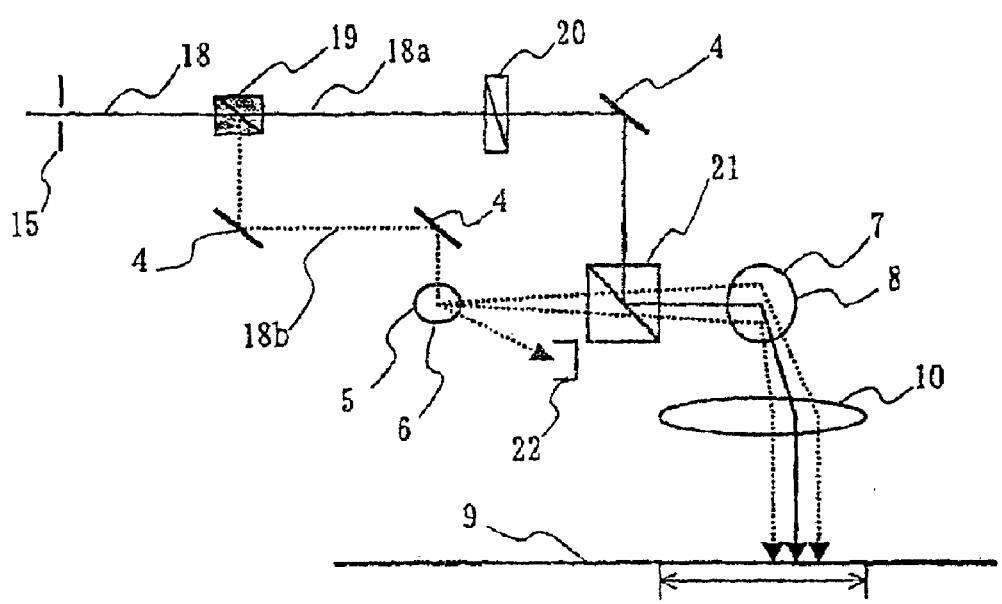
FIG. 4 is a schematic diagram of a laser machining device according to Embodiment 2 of the present invention.

FIG. 4 is a schematic diagram of a laser machining device according to Embodiment 2 of the present invention. The same reference numerals as in Embodiment 1 denote components of the same names in the embodiment.

In FIG. 4, a laser machining device 1 has: an aperture 15 for setting the beam spot diameter of a linearly polarized laser beam 18 emitted from a laser oscillator 3 (not shown) to an arbitrary beam spot diameter on an object 9; a splitting means 19 for splitting the laser beam 18 passing through the aperture 15 into a second laser beam (to be referred to as a laser beam 18a hereinafter) and a first laser beam (to be referred to as a laser beam 18b hereinafter); a phase plate 20 for turning a polarization direction of the laser beam 18a at 90°; galvanometer scanners 6 having sub-deflecting galvanometer mirrors 5 which are sequentially arranged along an optical path and can be moved to deflect the laser beam 18b at a small angle; a polarized beam splitter 21 for reflecting the laser beam 18a (S-polarized beam) turned at 90° by the phase plate 20 and transmitting the laser beam 18b (P-polarized beam) from the sub-deflecting galvanometer mirrors 5; a main deflecting galvanometer scanner 8 having a main deflecting galvanometer mirror 7 for deflecting the laser beams 18a and 18b from the polarized beam splitter 21 at a large angle; an Fθ lens 10 for converging the laser beams 18a and 18b onto the object 9; and an X-Y stage 11 (not shown) having an upper surface on which the object 9 is fixed and driven on an X-Y plane. The two sub-deflecting galvanometer scanners 6 can guide the laser beam 18b out of the polarized beam splitter 21. For this reason, a beam absorber 22 for receiving and absorbing the laser beam 18b in such a case is arranged.

In order to change the directions of the optical paths of the laser beams 18a and 18b, a bend mirror 4 is used. Although not shown in FIG. 4, in order to make it possible to irradiate a laser beam on any position on the X-Y plane as in Embodiment 1, the sub-deflecting galvanometer mirrors 5, the sub-deflecting galvanometer scanners 6, the main deflecting galvanometer mirror 7, and the main deflecting galvanometer scanner 8 are constituted by mirrors and scanners which are driven in the X direction and mirrors and scanners which are driven in the Y direction.

An operation in Embodiment 2 of the present invention will be described below.

The laser beam 18 which is a linearly polarized beam is split into the laser beams 18a and 18b having a strength ratio of 1:1 by the splitting means 19. The polarization direction of the laser beam 18a is turned at 90° by the phase plate 20 to obtain an S-polarized beam. As the splitting means 19, a diffractive optics is suitable because the splitting means 19 can stabilize a spectral ratio regardless of a stain or the like of the element. As the phase plate 20, a λ/2 plate or the corresponding component is used.

In this manner, the laser beam 18a which is the S-polarized beam is reflected by the polarized beam splitter 21, and an irradiation position on the object 9 is determined by the main deflecting galvanometer scanner 8. On the other hand, the laser beam 18b split by the splitting means 19 is incident on the sub-deflecting galvanometer scanners 6 as a P-polarized beam, and is incident on a position different from the position of the laser beam 18a on the main deflecting galvanometer scanner 8. Therefore, a relative irradiation position of the laser beam 18b on the object 9 corresponding to the irradiation position of the laser beam 18a on the object 9 is determined by the sub-deflecting galvanometer scanner 6.

Figure 5:
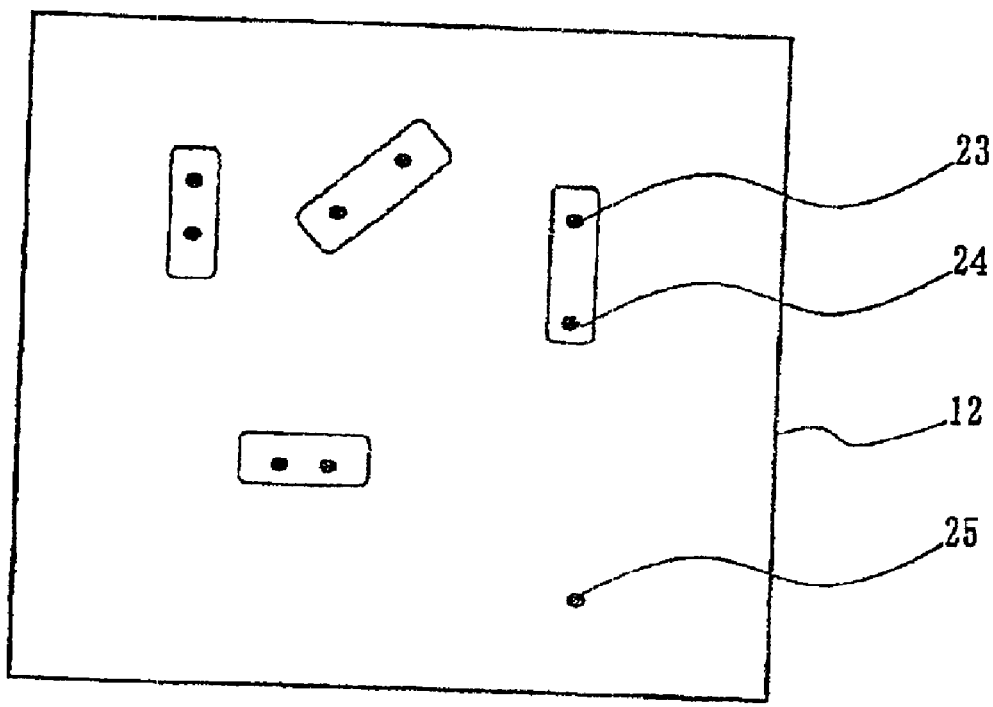
FIG. 5 is a diagram for explaining laser irradiation positions according to Embodiment 2 of the present invention.

FIG. 5 is a schematic diagram of laser irradiation positions when irradiation is performed onto the object by the laser machining device according to this embodiment.

In FIG. 5, in a scan area 12 obtained by the main deflecting galvanometer scanner 8 on the object 9, when irradiation of the laser beam 18 from the laser oscillator 3 (not shown) is performed once, by positioning performed by the main deflecting galvanometer scanner 8, the laser beams 18a and 18b are simultaneously irradiated on a beam irradiation position 23 obtained by the laser beam 18a and a beam irradiation position 24 obtained by the laser beam 18b.

As in a case in which an odd-number of holes are to be machined in the scan area 12 on the object 9, it is not always good that the laser beams are irradiated on two positions. In this case, only the laser beam 18a is irradiated on a desired position 25 by the main deflecting galvanometer scanner 8, and the laser beam 18b is absorbed by the beam absorber 22 under the control of the sub-deflecting galvanometer scanners 6, so that the laser beam 18b is prevented from being incident on the main deflecting galvanometer scanner 8.

The positional relationships of the respective optical components according to this embodiment can be expressed like FIG. 3. More specifically, the dotted lines in FIG. 3 correspond to a flux of light of the laser beam 18b deflected by the sub-deflecting galvanometer scanners 6. Therefore, a thinking which holds a numerical aperture NA to satisfy NA>0.08 is the same as that in Embodiment 1.

With the above configuration, laser beams can be simultaneously irradiated on two points, a machining time can be shortened.

Only one Fθ lens may be used, the cost can be prevented from being increased, and a machining machine can be prevented from being increased in size.

Embodiment 3.

Figure 6:
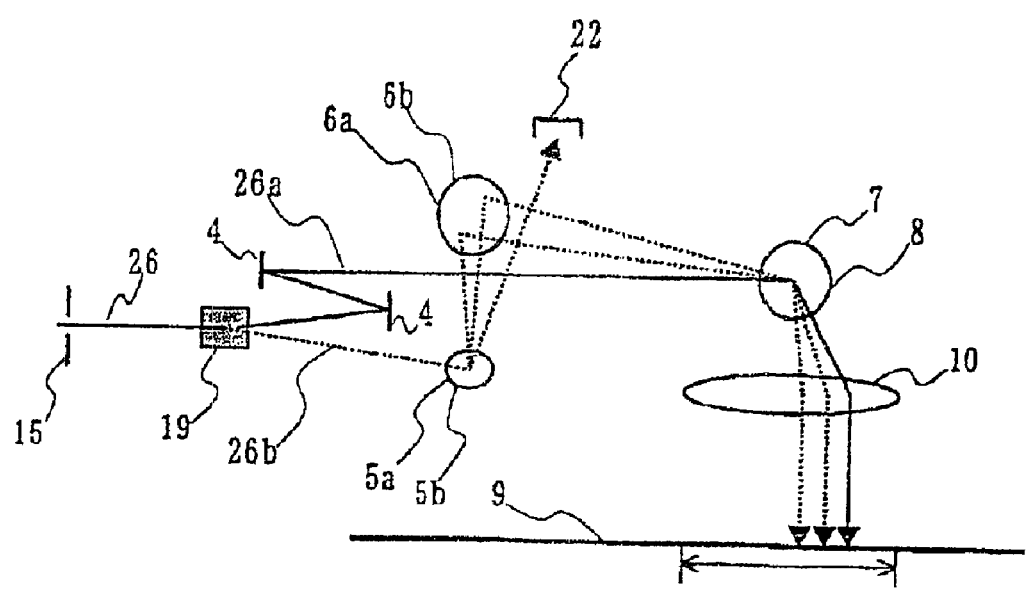
FIG. 6 is a schematic diagram of a laser machining device according to Embodiment 3 of the present invention.

FIG. 6 is a schematic diagram of a laser machining device according to Embodiment 3 of the present invention. The same reference numerals as in Embodiment 1 denote components of the same names in this embodiment.

In FIG. 6, a laser machining device 1 has: an aperture 15 for setting the beam spot diameter of a laser beam 26 emitted from a laser oscillator 3 (not shown) to an arbitrary beam spot diameter on an object 9; a splitting means 19 for splitting the laser beam 26 passing through the aperture 15 into a laser beam 26a and a laser beam 26b; galvanometer scanners 5b having first sub-deflecting galvanometer mirrors 5a which are sequentially arranged along an optical path and can be moved to deflect the laser beam 26b at a small angle; galvanometer scanners 6b having second sub-deflecting galvanometer mirrors 6a which are arranged along an optical path after the galvanometer scanners 6 a and can be moved to deflect the laser beam 26b at a small angle; a main deflecting galvanometer scanner 8 having a main deflecting galvanometer mirror 7 for deflecting the laser beams 26a and 26b at a large angle; an Fθ lens 10 for converging the laser beams 26a and 26b onto the object 9; and an X-Y stage 11 (not shown) having an upper surface on which the object 9 is fixed and driven on an X-Y plane. The first sub-deflecting galvanometer scanners 5b can guide the laser beam 26b besides the second sub-deflecting galvanometer mirrors 6a. For this reason, a beam absorber 22 for receiving and absorbing the laser beam 26b in such a case is arranged.

In order to change the directions of the optical paths of the laser beams 26a and 26b, a bend mirror 4 is used. Although not shown in FIG. 6, in order to make it possible to irradiate a laser beam on any position on the X-Y plane as in Embodiment 1, the first sub-deflecting galvanometer mirrors 5a, the first sub-deflecting galvanometer mirrors 5b, the second sub-deflecting galvanometer scanners 6a, the second galvanometer scanners 6b, the main deflecting galvanometer mirror 7, and the main deflecting galvanometer scanner 8 are constituted by mirrors and scanners which are driven in the X direction and mirrors and scanners which are driven in the Y direction.

In this manner, a first sub-deflecting galvanometer scanner 5b and the second sub-deflecting galvanometer scanner 6b are arranged, so that the split laser beams 26a and 26b pass through the main deflecting galvanometer scanners 8 at the front focal point of the Fθ lens 10 on an Fθ lens axis.

An operation of Embodiment 3 of the present invention will be described below.

The laser beam 26 is split into the laser beams 26a and 26b having a strength ratio of 1:1 by the splitting means 19. As the splitting means 19, a diffractive optics is suitable because the splitting means 19 can stabilize a spectral ratio regardless of a stain or the like of the element.

In this manner, the laser beam 26a is incident on the main deflecting galvanometer scanner 8, so that irradiation positions onto the object 9 are determined. On the other hand, the laser beam 26b split by the splitting means 19 is incident on the first sub-deflecting galvanometer scanner 5b, is incident on the second sub-deflecting galvanometer scanner 6b, and is incident on a position different from the position of the laser beam 26a on the main deflecting galvanometer scanner 8. Therefore, a relative irradiation position of the laser beam 26b on the object 9 corresponding to the irradiation position of the laser beam 26a on the object 9 is determined by the first sub-deflecting galvanometer scanner 5b and the second sub-deflecting galvanometer scanner 6b.

The relationships of the first sub-deflecting galvanometer mirror 5a, the second sub-deflecting galvanometer mirror 6a, and the main deflecting galvanometer mirror 7 are set as described below. That is, the first sub-deflecting galvanometer mirror 5a is inclined at an angle corresponding to an irradiation position of the laser beam 26a, and the second sub-deflecting galvanometer mirror 6a returns the laser beam 26b such that the laser beam 26b passes through a position corresponding to a front focus position of the Fθ lens 10 on the center axis of the Fθ lens 10. In this manner, the laser beam 26b passes through an effective area of the main deflecting galvanometer mirror 7 arranged at a position corresponding to the front focus position of the Fθ lens 10 on the center axis of the Fθ lens 10.

Figure 7:
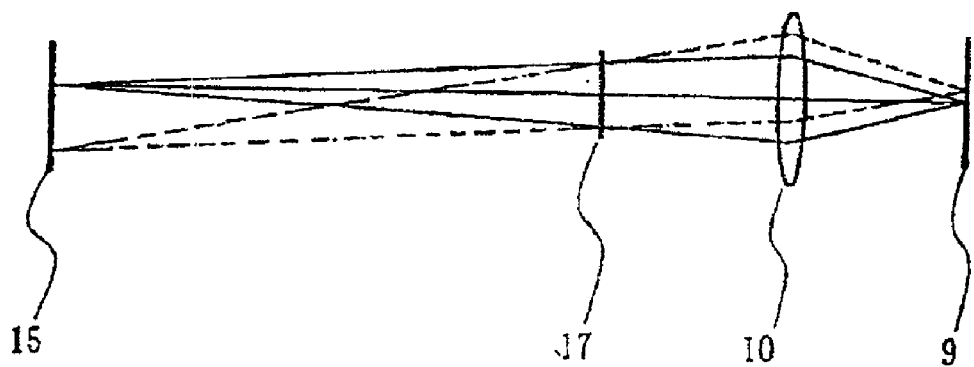
FIG. 7 is a diagram showing the configuration of an optical system according to Embodiment 3 of the present invention.

FIG. 7 is a schematic diagram showing the positional relationships of respective optical components according to this embodiment. In FIG. 7, a flux of light indicated by solid lines expresses the laser beam 26a reaching the object 9 through an aperture 15, a central position in an optical axis direction between the two main deflecting galvanometer mirrors constituting the main deflecting galvanometer mirror 7, and the Fθ lens 10. On the other hand, the laser beam 26b is irradiated on the main deflecting galvanometer mirror 7 without being offset because the laser beam 26b passes through the front focus position of the Fθ lens 10 on the center axis of the Fθ lens 10. This is equivalent to that the position of the aperture 15 moves at an angle of 90 with respect to the optical axis direction like a flux of light indicated by dotted lines in FIG. 7.

Since the optical system is constituted as described above, in the device according to this embodiment, when an effective diameter of the main deflecting galvanometer mirror is determined, it need not be considered that the laser beam is swung by a sub-deflecting galvanometer scanner. An area in which beams can be simultaneously irradiated by the sub-deflecting galvanometer scanner and the main deflecting galvanometer scanner is widened without holding the small diameter, and a machining speed increases. However, in order to perform precise hole drilling, an element (e.g., a distance between the Fθ lens and the object) except for the effective diameter of the galvanometer mirror must be considered to satisfy the numerical aperture>0.08.

When irradiation is performed to the object by the device according to this embodiment, as in the case shown in FIG. 5 in Embodiment 2, the laser beam 26a and the laser beam 26b are simultaneously irradiated on two positions. When a laser beam is irradiated on one position, the first sub-deflecting galvanometer scanner 5b causes the laser beam 26b to be absorbed by the beam absorber 22.

In Embodiment 2 and Embodiment 3, although each of the sub-deflecting galvanometer scanners uses two galvanometer mirrors, the sub-deflecting galvanometer scanner may use only one galvanometer mirror. In this case, although scanning in only one direction on the X-Y plane on the object 9 is performed, the scanning is effective depending on the arrangement a hole to be machined, and the device configuration is simplified by reducing the number of galvanometer mirrors.

The above embodiment describes the case in which the laser machining device is applied to precise hole drilling. However, the laser machining device can also be applied to another laser machining as a matter of course.

Embodiment 4.

Figure 8:
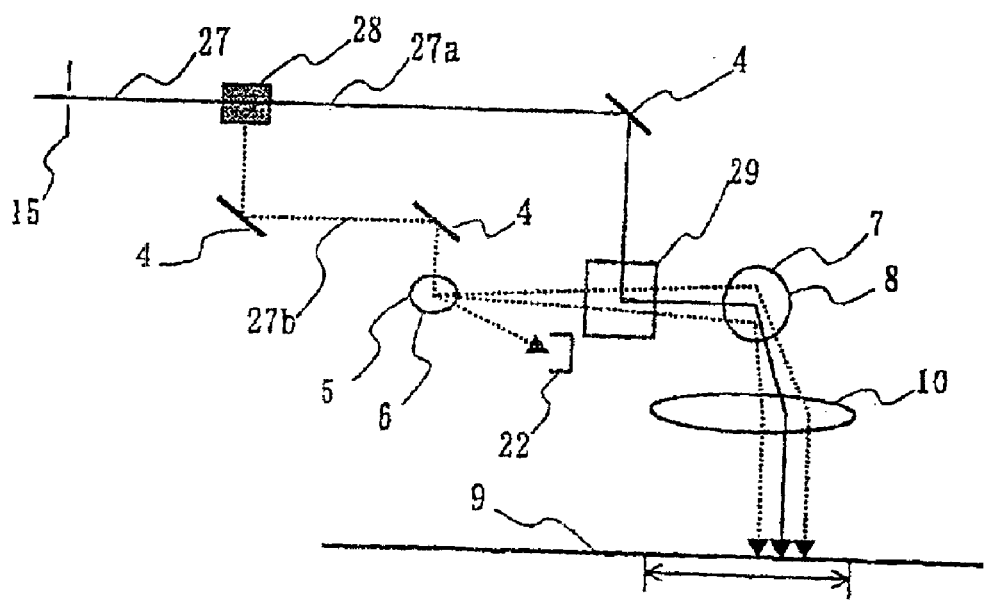
FIG. 8 is a schematic diagram of a laser machining device according to Embodiment 4 of the present invention.
Figure 9:
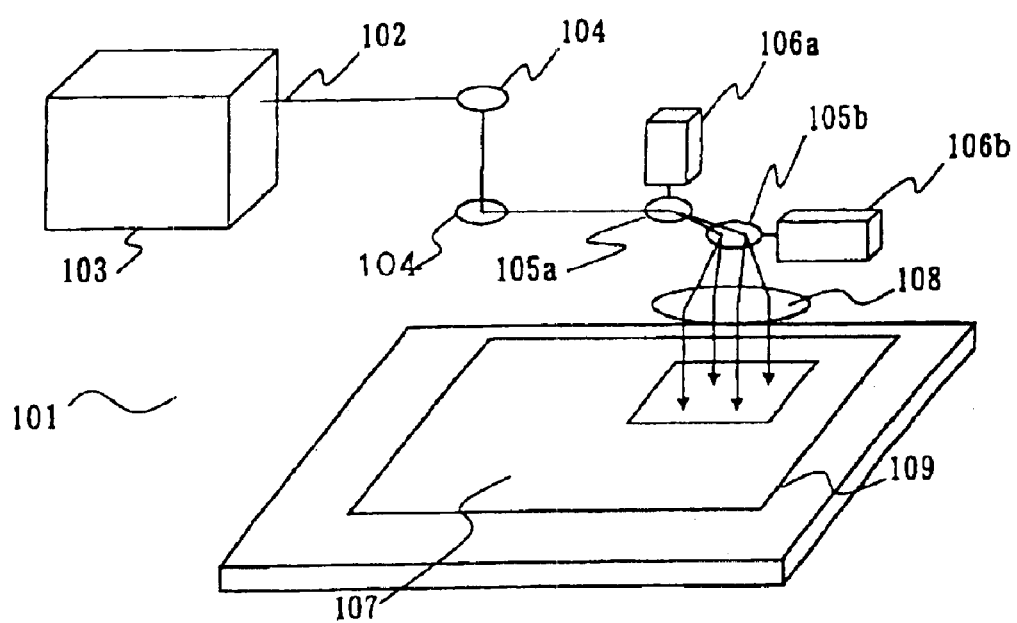
FIG. 9 is a diagram showing a conventional laser machining device.
Figure 10:
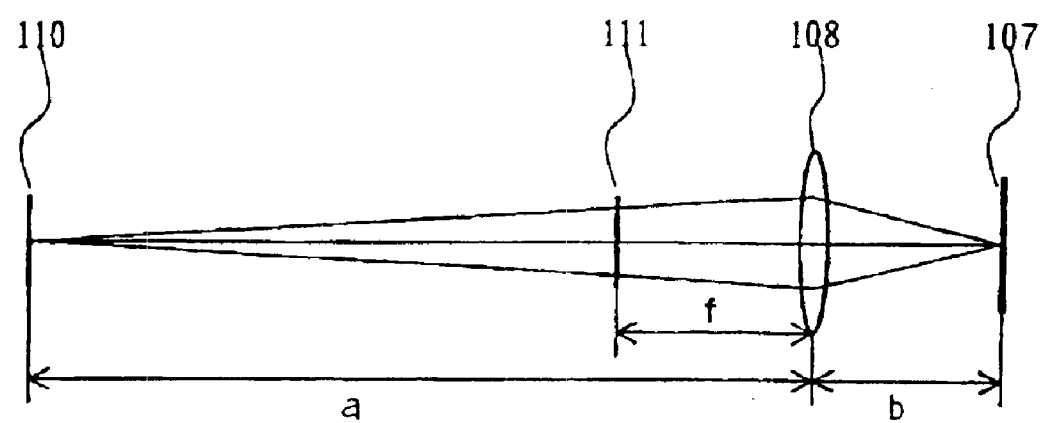
FIG. 10 is a diagram showing the configuration of a conventional optical system.

FIG. 8 is a schematic diagram of a laser machining device according to Embodiment 4 of the present invention. The same reference numerals as in Embodiment 1 and Embodiment 2 denote the same parts in Embodiment 3.

FIG. 8, a laser machining device 1 has: an aperture 15 for setting the beam spot diameter of a circularly polarized laser beam 27 emitted from a laser oscillator 3 (not shown) to an arbitrary beam spot diameter on an object 9; a spectral polarizing beam splitter 28 for splitting the laser beam 27 passing through the aperture 15 into a laser beam 27a and a laser beam 27b; a bend mirror 4 which is combined such that the laser beam 27a serving as a P-polarized beam for the spectral polarizing beam splitter 28 serves as an S-polarized beam for a coupling polarizing beam splitter 29; sub-deflecting galvanometer scanners 6a having sub-deflecting galvanometer mirrors 5 which are sequentially arranged along an optical path and can be moved to deflect the laser beam 27*b* split by the spectral polarizing beam splitter 28 at a small angle; a coupling polarizing beam splitter 29 for coupling the laser beam 27*a* serving as an S-polarized beam and the laser beam 27*b* from the sub-deflecting galvanometer mirrors 5; a main deflecting galvanometer scanner 8 having a main deflecting galvanometer mirror 7 for deflecting the laser beams 27*a* and 27*b* from the coupling polarizing beam splitter 29 at a large angle; an Fθ lens 10 for converging the laser beams 27*a* and 27*b* onto the object 9; and an X-Y stage 11 (not shown) having an upper surface on which the object 9 is fixed and driven on an X-Y plane. The sub-deflecting galvanometer scanners 6 can guide the laser beam 27*b* out of the coupling polarizing beam splitter 29. For this reason, a beam absorber 22 for receiving and absorbing the laser beam 27*b* in such a case is arranged.

The bend mirror 4 is also used when the direction of the optical path of the laser beam 27*b* is changed. Although not shown in FIG. 8, in order to make it possible to irradiate a laser beam on any position on the X-Y plane as in Embodiment 1, the sub-deflecting galvanometer mirrors 5, the sub-deflecting galvanometer scanners 6, the main deflecting galvanometer mirror 7, and the main deflecting galvanometer scanner 8 are constituted by mirrors and scanners which are driven in the X direction and mirrors and scanners which are driven in the Y direction.

An operation of Embodiment 4 according to the present invention will be described below.

The laser beam 27 serving as a circularly polarized beam is split into the laser beams 27*a* and 27*b* having a strength ratio of 1:1 by the spectral polarizing beam splitter 28, and the polarizing direction of the laser beam 27*a* is changed by the bend mirror 4 to be an S-polarized beam for the coupling polarizing beam splitter 29.

In this manner, the laser beam 27*a* serving as the S-polarized beam for the coupling polarizing beam splitter 29 is incident from the coupling polarizing beam splitter 29 on the main deflecting galvanometer scanner 8, so that irradiation positions onto the object 9 are determined. On the other hand, the laser beam 27*b* split by the spectral polarizing beam splitter 28 is incident on the sub-deflecting galvanometer scanner 6, and is incident on a position different from the position of the laser beam 27*a* from the coupling polarizing beam splitter 29 to the main deflecting galvanometer scanner 8. Therefore, a relative irradiation position of the laser beam 27*b* on the object 9 corresponding to the irradiation position of the laser beam 27*a* on the object 9 is determined by the sub-deflecting galvanometer scanners 6.

The relationships of the respective optical components of this embodiment are the same as the relationships shown in FIG. 3. More specifically, the dotted lines in FIG. 3 correspond to a flux of light of the laser beam 27*b* deflected by the sub-deflecting galvanometer scanners 6.

In each of the laser machining devices described in Embodiments 2 to 4, when the distances of optical paths in which the split first and second laser beams are propagated are equal to each other, holes having equal diameters can be machined on an object.

Industrial Applicability

As has been described above, a laser machining device according to the present invention is useful as a device which performs machining by irradiating a laser beam on an object.

What is claimed is:

1. A laser machining device comprising:
   a first scanner for deflecting a traveling direction of a first laser beam to an arbitrary direction with a mirror;
   a second scanner for deflecting traveling directions of a second laser beam and said first laser beam passing through said first scanner to arbitrary directions with mirrors; and
   a lens for converging said second laser beam and said first laser beam passing through said second scanner.

2. A laser machining device according to claim 1, wherein the first laser beam and the second laser beam have different polarization directions, and a beam splitter which reflects one laser beam and transmits the other laser beam is arranged in front of the second scanner such that the laser beams from said beam splitter are propagated to said second scanner.

3. A laser machining device according to claim 2 comprising:
   an oscillator;
   a diffractive optics for splitting a linearly polarized laser beam oscillated from said oscillator into a first laser beam and a second laser beam; and
   a phase plate for changing the polarization direction of said second laser beam.

4. A laser machining device according to claim 2 comprising:
   an oscillator; and
   a spectral beam sputter for splitting a circularly polarized laser beam oscillated from said oscillator into a first laser beam and a second laser beam having different polarization directions, respectively.

5. A laser machining device according to claim 3, wherein an aperture is formed in front of the diffractive optics, so that an image transfer optical system can be formed between the aperture and an object arranged behind the lens.

6. A laser machining device according to claim 4, wherein an aperture is formed in front of the spectral beam splitter, so that an image transfer optical system can be formed between the aperture and an object arranged behind the lens.

7. A laser machining device according to claim 5, wherein a distance in which the first laser beam is propagated from the diffractive optics to the lens is made almost equal to a distance in which the second laser beam is propagated from said diffractive optics to said lens.

8. A laser machining device according to claim 6, wherein a distance in which the first laser beam is propagated from the spectral beam splitter to the lens is made almost equal to a distance in which the second laser beam is propagated from said spectral beam splitter to said lens.

9. A laser machining device according to claim 5, wherein a numerical aperture calculated by a mirror diameter of the second scanner and a distance between the lens and the object is set to be not less than 0.08.

10. A laser machining device according to claim 6, wherein a numerical aperture calculated by a mirror diameter of the second scanner and a distance between the lens and the object is set to be not less than 0.08.

11. A laser machining device according to claim 7, wherein a numerical aperture calculated by a mirror diameter of the second scanner and a distance between the lens and the object is set to be not less than 0.08.

12. A laser machining device according to claim 8, wherein a numerical aperture calculated by a mirror diameter of the second scanner and a distance between the lens and the object is set to be not less than 0.08.

13. A laser machining device comprising:
- a first scanner for deflecting a traveling direction of a first laser beam to an arbitrary direction with a mirror;
- a second scanner for deflecting traveling directions of a second laser beam and said first laser beam passing through at least said first scanner to arbitrary directions with a mirror; and
- a third scanner for deflecting a traveling direction of said first laser beam passing through said first scanner to an arbitrary direction with a mirror; and
- a lens for converging said second laser beam passing through said second scanner and said first laser beam passing through said first, second and third scanners.

14. A laser machining device according to claim 13, wherein an aperture is formed on at least one of the traveling directions of the first laser beam in front of the first scanner, and the traveling direction of the second laser beam in front of the second scanner so that an image transfer optical system is formed between the aperture and an object arranged behind the lens.

15. A laser machining device according to claim 14, wherein a numerical aperture calculated by a mirror diameter of the second scanner and a distance between the lens and the object is set to be not less than 0.08.

16. A laser machining device comprising:
- a first scanner for deflecting a traveling direction of a laser beam to an arbitrary direction with a mirror;
- a second scanner for deflecting a traveling direction of said laser beam passing through said first scanner to an arbitrary direction with a mirror; and
- a lens for converging said laser beam passing through said second scanner,
- wherein an angle at which said laser beam is deflected by said first scanner being smaller than an angle at which said laser beam is deflected by said second scanner.

17. A laser machining device according to claim 16, wherein an aperture is formed in front of the first scanner, so that an image transfer optical system is formed between the aperture and an object arranged behind the lens.

18. A laser machining device according to claim 17, wherein a numerical aperture calculated by a mirror diameter of the second scanner and a distance between the lens and the object is set to be not less than 0.08.

* * * * *